Patented Mar. 31, 1925.

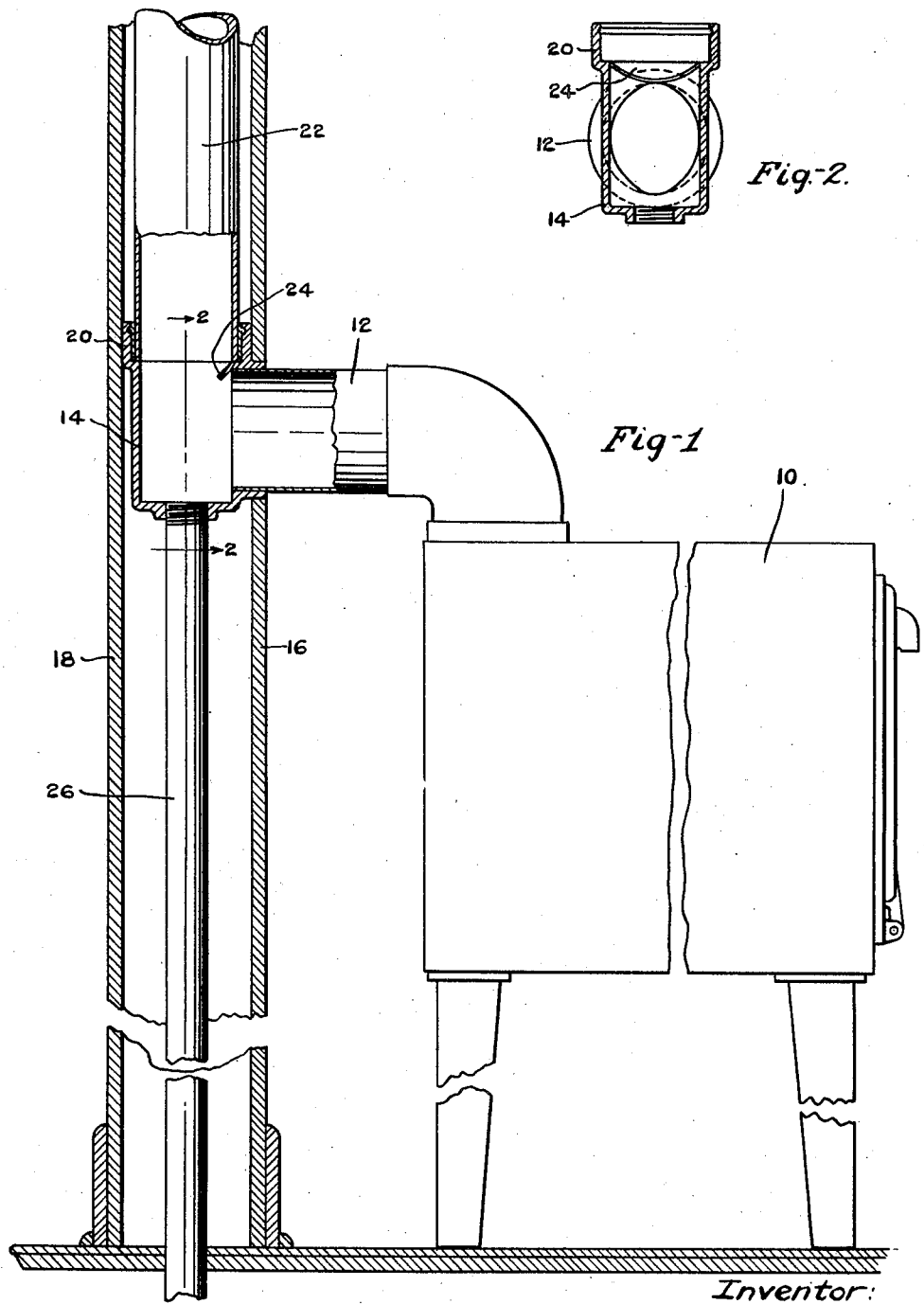

1,531,884

UNITED STATES PATENT OFFICE.

GUST SODERLIN, OF MINNEAPOLIS, MINNESOTA.

SPENT-GAS ESCAPE DEVICE FOR GAS RANGES.

Application filed August 11, 1924. Serial No. 731,365.

*To all whom it may concern:*

Be it known that I, GUST SODERLIN, a citizen of the United States, residing at Minneapolis, in the county of Hennepin and State of Minnesota, have invented certain new and useful Improvements in Spent-Gas Escape Devices for Gas Ranges, of which the following is a specification.

My invention relates to spent gas escape devices for gas ranges and an object is to provide a device of this character for carrying away the gases formed by combustion in the range and at the same time prevent condensed moisture from getting back into a range.

The full objects and advantages of my invention will appear in connection with the detailed description thereof and the novel features embodied in my inventive idea will be particularly pointed out in the claims.

In the accompanying drawings which illustrate my invention in one form, Fig. 1, is a view of the device partly in side elevation and partly in vertical section. Fig. 2 is a view in section on the line 2—2 of Fig. 1.

Referring to the construction shown in drawings, the numeral 10 designates a gas range which is provided with a pipe 12 for the escape of burned gases. The pipe 12 extends into a T member 14 preferably of cast iron which is set between the inner and outer walls 16 and 18 of the building. The T member 14 at its upper end is enlarged to provide a socket 20 within which the lower end of an escape pipe 22 is secured by means of lead or other sealing material which makes an air-tight joint, it being understood that the pipe 22 leads to the outside of the building. The T-member 14 is provided with an inwardly inclined lip 24 located above the point of entrance of the pipe 12 into the member 14. The lower end of the member 14 is partly closed by an annular portion to provide a reduced opening to which is connected a drip pipe 26 for carrying away any moisture which condenses in the escape pipe 22. The lip 24 prevents the condensed moisture from getting into the pipe 12 and thence back into the range.

I claim:

1. A spent gas escape device for gas ranges comprising a T member adapted to be placed between the inner and outer walls of a building, a pipe connecting the gas range with said T member, a gas escape pipe leading from the upper end of said T member, and a drip pipe leading from the lower end of said T member.

2. A spent gas escape device for gas ranges comprising a T member adapted to be placed between the inner and outer walls of a building, a pipe connecting the gas range with said T member, said T member having an enlarged upper end constituting a socket, a gas escape pipe secured in said socket by sealing material, and a drip pipe leading from the lower end of said T member.

3. A spent gas escape device for gas ranges comprising a T member adapted to be placed between the inner and outer walls of a building, a pipe connecting the gas range with said T member, a gas escape pipe leading from the upper end of said T member, a drip pipe leading from the lower end of said T member, and an inwardly-inclined lip located above the point of entrance of said first-mentioned pipe into said T member for deflecting drip therefrom.

In testimony whereof I hereunto affix my signature.

GUST SODERLIN.